(12) United States Patent
Tonelli et al.

(10) Patent No.: US 7,616,114 B2
(45) Date of Patent: Nov. 10, 2009

(54) SEISMIC SENSOR FOR A SECURITY SYSTEM AND SECURITY SYSTEM INCLUDING SUCH A SENSOR

(76) Inventors: Giorgio Tonelli, Via Bergiola, 30/A, Massa (IT) 54100; Aldo Tonelli, Viale Roma, 140, Massa (IT) 54100

( * ) Notice: Subject to any disclaimer, the term of this patent is extended or adjusted under 35 U.S.C. 154(b) by 327 days.

(21) Appl. No.: 11/759,853

(22) Filed: Jun. 7, 2007

(65) Prior Publication Data
US 2008/0006474 A1 Jan. 10, 2008

(30) Foreign Application Priority Data
Jun. 9, 2006 (EP) .................................. 06425390

(51) Int. Cl.
G08B 13/08 (2006.01)
(52) U.S. Cl. .................................. 340/545.4; 340/693.5
(58) Field of Classification Search .............. 340/545.4, 340/657, 665, 666, 693.5
See application file for complete search history.

(56) References Cited

U.S. PATENT DOCUMENTS 4,991,439 A 2/1991 Betts 6,418,792 B1 7/2002 Spychalski
7,113,091 B2 * 9/2006 Script et al. .................. 340/546

FOREIGN PATENT DOCUMENTS

| EP | 1005003 A2 | 5/2000 |
| WO | 96/10195 A1 | 4/1996 |
| WO | 00/19243 A1 | 4/2000 |

* cited by examiner

Primary Examiner—Toan N Pham
Assistant Examiner—Travis R Hunnings
(74) Attorney, Agent, or Firm—Seed IP Law Group PLLC

(57) ABSTRACT

A seismic sensor for a security system is described, the sensor comprising: a piezoelectric transducer suitable for converting mechanical stresses into electrical signals; a base structure including a seat suitable for receiving said transducer; a cover element that can be coupled with the base structure to define an inner chamber of said sensor. The sensor is wherein the cover element has an essentially bell-shaped body, is equipped with a bottom opening and includes side walls that extend around an axis of said opening, the base structure being provided with a collar that surrounds said seat and that crosses said bottom opening so as to define at least one channel communicating with said chamber between the side walls of said cover element and said collar.

29 Claims, 3 Drawing Sheets

SEISMIC SENSOR FOR A SECURITY SYSTEM AND SECURITY SYSTEM INCLUDING SUCH A SENSOR

BACKGROUND

1. Technical Field

The present invention refers, in general, to the technical field of security systems and, in particular, concerns a seismic sensor for a security system, as defined in the preamble of the first claim. The present invention also concerns a security system including such a sensor.

2. Description of the Related Art

As known, for a long time there has been a great need to protect the perimeter of buildings, with immediate indication, through suitable emission of an alarm, of a possible attempt to gain unwarranted access to a building being protected or of a possible attempt to escape from it.

Security systems, known as underground systems, which use various types of sensors, intended to be arranged in the ground or incorporated in the flooring and along the perimeter of a building to be protected, or along its potentially accessible areas are known and extensively used. In practice, the sensors of underground systems are seismic sensors generally sensitive to footsteps on the ground or on the flooring and deriving from a person approaching the perimeter or the protected area.

A particular security system of the type described above is disclosed by international patent application published as WO 96/10195, which in particular discloses a security system including a plurality of pressure sensors, or seismic sensors, equipped with a piezoelectric transducer.

In the seismic sensors disclosed by the aforementioned patent application, the seismic waves that propagate through the ground, caused by the passing of a person at the surface and near to the sensor, produce the movement of a suitable "receptor", the pivot point of which is indirectly coupled through soft resin with a piezoelectric transducer housed in the base of the sensor.

The movement of the receptor with respect to the base of the sensor causes a weak mechanical stress at the piezoelectric membrane, which thus produces an electrical impulse that is then amplified and analyzed by suitable electronic circuits.

The piezoelectric transducer is characterized by a high conductivity of two of its conductive surfaces insulated from each other by a very fine insulating layer.

It has been observed that the correct operation of the piezoelectric transducer and its lifetime essentially depend upon two factors:

a stable working position, which does not involve the application of high mechanical stress to the transducer, so as to prevent it from breaking; and perfect electrical insulation of the two conductive surfaces of the transducer, both between each other and against the surrounding environment (ground).

The mechanical protection of the transducer is obtained by designing the base of the sensor like a rigid container that houses the transducer leaving just its upper free surface accessible. The coupling between transducer and receptor occurs indirectly, through a thick layer of polyurethane or epoxy resin arranged on the free surface of the transducer, so as to prevent it from breaking due to a possible direct contact with the pin of the receptor.

The electrical insulation is ensured by the same resin that effectively also carries out the function of sealing and electrically insulating the transducer from the surrounding environment from infiltrations of water/humidity.

With this type of solution the protection from humidity relies totally on the integrity of the layer of sealing resin that, in the long term, due to thermal shifts and perhaps due to contact with particular chemical substances that may be present in the ground, can deteriorate and lose its adhesion.

Moreover, the different expansion of the materials (resin and plastic of the casing) caused by the continuous thermal cycles (night/day, winter/summer), can cause the resin to detach from the casing and consequently water channels to be formed on the edges.

For greater protection from infiltrations a thick layer of additional sealing material, sufficiently soft to allow the receptor to move with respect to the base, has been foreseen along the edges defined between the receptor and the base of the sensor. Such a sealing material is the only barrier against the penetration of water or humidity inside the sensor.

BRIEF SUMMARY

A purpose of the present invention is to provide a sensor that, with respect to the sensors of the prior art described above, is stronger with respect to possible infiltrations of water inside the sensor.

Such a purpose is accomplished through a sensor as defined in the attached claim 1 in its most general form and in the dependent claims in some particular embodiments.

A further purpose of the present invention is to provide a security system as defined in the attached claim 13.

BRIEF DESCRIPTION OF THE SEVERAL VIEWS OF THE DRAWINGS

The invention shall be better understood from the following detailed description of embodiments thereof, given as an example and therefore in no way limiting in relation to the attached drawings, in which.

In the figures, identical or similar elements are indicated with the same reference numerals.

DETAILED DESCRIPTION

Figure 1:
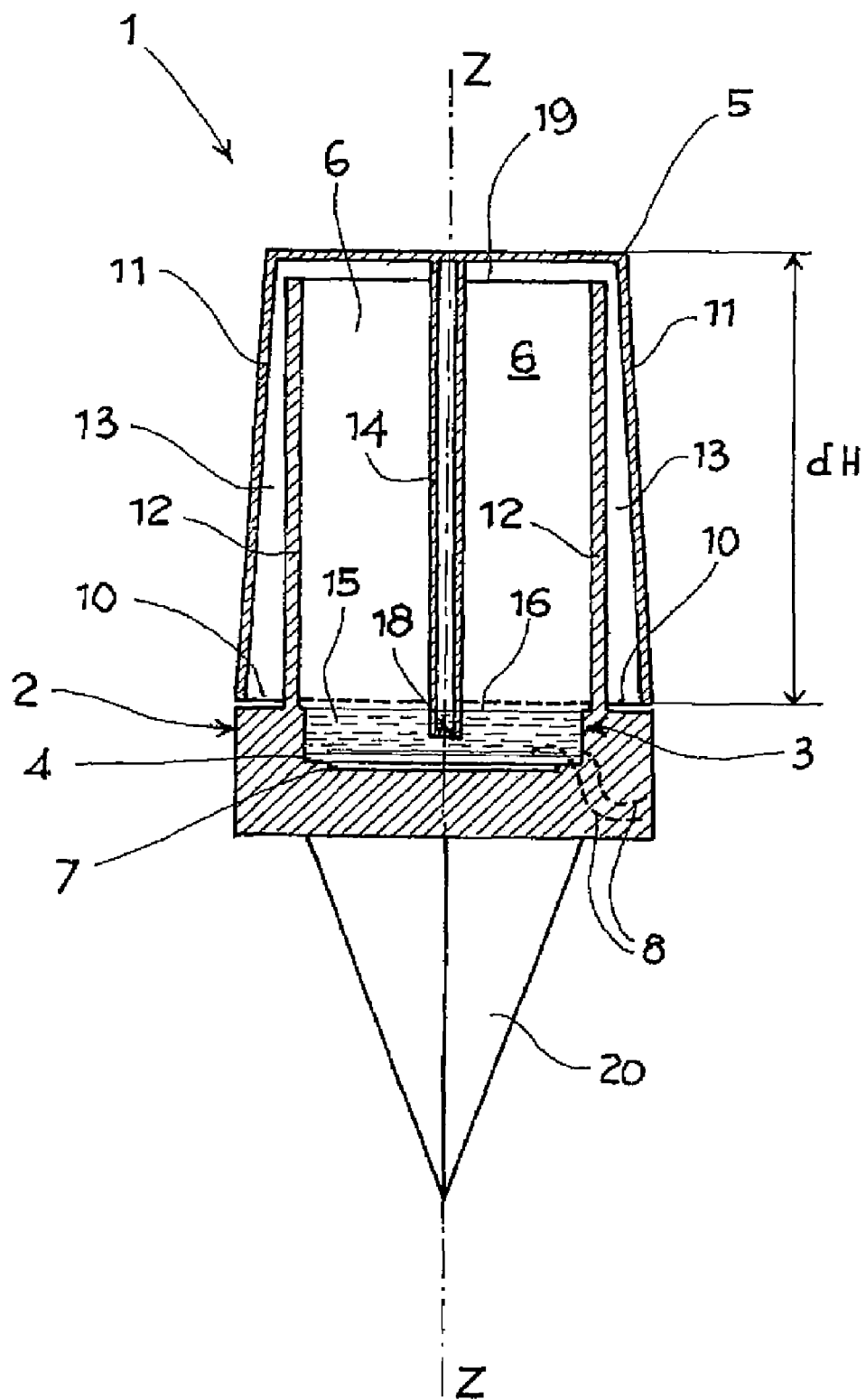
FIG. 1 shows a schematic side section view of a first embodiment of a sensor in accordance with the present invention.

FIG. 1 schematically shows a side section view of a particularly preferred embodiment of a seismic sensor, globally indicated with 1, in accordance with one embodiment of the present invention. The seismic sensor 1 is intended to be installed below a layer of ground, preferably at a depth of 50-60 cm, to detect thrusts of pressure acting substantially near to the surface of the ground and that propagate in the form of seismic waves inside the layer of ground. For example, such thrusts of pressure are caused by the passing of a person or of a vehicle on the surface of the ground that incorporates the sensor 1, in a range of the seismic sensor 1 that constitutes the working area of the sensor. The sensor 1 can be part of a system, or security apparatus, including many parts each including a plurality of sensors. A security apparatus of this type is, for example, described in the aforementioned European patent EP 1005003 and for this reason a description of the system of such an apparatus shall not be dealt with in any greater depth at this stage. A seismic sensor 1 in accordance with the present invention can also advantageously be used in a security apparatus of the type described in the international patent application published as WO 2006/051561.

The seismic sensor 1 includes a base structure 2, for example made from hard plastic, including an assembly seat 3 that is such as to receive a piezoelectric transducer 4 suitable for supplying in output electrical signals in response to mechanical stresses to which it is subjected.

The piezoelectric transducer 4 is preferably a plate-shaped transducer, in this example disc-shaped, and in practice comprises a plate made from conductive material, for example brass or copper, coated with a thin layer of piezoelectric ceramic.

A flexing chamber 7 for the transducer 4 opens on the bottom of the assembly seat 3. Preferably, but not limitingly, the flexing chamber 7 is defined by a circular bottom and by a cylindrical shell and preferably has a very low depth. For example, in a particularly preferred embodiment, the flexing chamber 7 has a depth roughly within the range 1 mm-3 mm. This shallow depth advantageously makes it possible to avoid the transducer 4 breaking when it is subjected to excessive mechanical stresses, since in these cases the bottom of the flexing chamber 7, going into abutment against the transducer 4, limits the possibility of inflection of the latter.

From the transducer 4 project conducting wires 8 through which the transducer 4 supplies in output electrical signals in response to mechanical stresses that are such as to cause its deformation/inflection. Such conducting wires are intended to be connected to electrical cables, not shown in FIG. 1, which allow the connection of the sensor 1 to a security system.

The seismic sensor 1 includes a cover element 5, which can be coupled with the base structure 2 to define an inner chamber 6 of the seismic sensor 1, communicating with the assembly seat 3 of the piezoelectric transducer 4.

Advantageously, the cover element 5 has an essentially bell-shaped body and is equipped with a bottom opening 10 and includes side walls 11 that extend around an axis Z-Z of such a bottom opening 10. As depicted in the example of FIG. 1, advantageously, the base structure 1 includes a collar 12 that surrounds the assembly seat 3 of the sensor and that crosses the bottom opening 10 of the cover element so as to define, between the side walls 11 of the cover element 5 and the collar 12 at least one channel 13 communicating with the inner chamber 6 of the seismic sensor 1. In the particular embodiment represented in FIG. 1, the channel 13 is in reality a continuous and tubular interspace that surrounds the collar 12.

In the particular embodiment of FIG. 1, the cover element 5 is essentially a bell-shaped element in the form of an inverted pot. In a possible alternative embodiment, the cover element 5 could be made essentially like a bell-shaped element in the form of a bell-mouthed dome.

It should be observed that, advantageously, since the collar 12 has a mouth 19 arranged at a greater height than the bottom opening 10 of the cover element 5, by suitably sizing such a difference in height dH it is possible to ensure that the inner chamber 6 and the channel 13 contain a sufficient amount of air to prevent the penetration of water inside the seat of the transducer 4, even when the ground inside which the sensor 1 is buried is completely flooded. In practice, to obtain this it is necessary to size the height of the collar 12 so that a possible rise of water along the channel 13 is blocked by the pressure inside the chamber 6 before the level of water in the channel 13 rises beyond the height of the mouth of the collar 12. It has been observed that since the typical depths of installation of the seismic sensors do not generally exceed 70/80 cm, it is sufficient to foresee a collar of 4-5 centimeters to prevent the penetration of water inside the chamber 6. More specifically, it is sufficient to foresee a difference in height dH between the mouth of the collar 12 and the bottom opening of the bell-shaped element 5 equal to about 4-5 cm.

It should also be observed that, in the particularly advantageous embodiment in which the bell-shaped cover element 5 is essentially dome-shaped, possible drops of condensation that form on the inner walls of the cover element 5 tend to run inside the channel 13, thus avoiding the undesired falling of condensation into the assembly seat of the transducer.

It should also be observed that the cover element 5 represents a receptor member of pressure waves that propagate in the ground and it is provided with transmission means 14 suitable for transferring mechanical stresses to the transducer 4, in response to the captured pressure waves. In the particular example represented in FIG. 1, the transmission means are in the form of a central pin, or stem, 14 that extends inside the chamber 6 between the upper wall of the bell-shaped element 5, to which it is connected, until it reaches the assembly seat 3 of the transducer 4.

Advantageously, inside the assembly seat 3 a layer of protective material 15 is foreseen defined between a lower contact surface with the face of the transducer 4 facing towards the inner chamber 6 and an opposite free surface 16. Preferably, the layer of protective material 15 is a layer of resin that at least partly fills the assembly seat 3. More preferably, the layer of resin 15 almost totally fills the assembly seat 3 of the base structure 2. The resin used is preferably a bicomponent epoxy resin, or a bicomponent polyurethane resin.

The layer of resin 15 carries out a sealing action, preventing the formation of oxide on the face of the transducer 4 facing towards the chamber 6, due to possible infiltrations of humidity from the outside, or else from internal condensation caused by thermal variations. Advantageously, the layer of resin 15 is such as to carry out the additional function of transmitting thrusts of pressure captured by the cover element 5 to the transducer 4, so that the transducer 4 is subjected to corresponding mechanical stresses. For this reason, the layer of resin 15 has sufficient rigidity to ensure that such thrusts of pressure are essentially transmitted, in the example through the pin 14, to the transducer 4 and not absorbed by the layer of resin 15.

In a particularly advantageous embodiment, the pin 14 is a hollow tubular element. In the particular example described, in a non-limiting way, such a tubular element 14 has a circular section and has an opening 18 on the bottom that is such as to allow the resin of the protective layer 15 to penetrate inside the tubular element itself, at the assembly stage of the sensor 1, i.e., when the resin 15 is not yet in solid state. Preferably, the opening 18 on the bottom has a smaller section than the inner section of the tubular element, so that once the resin of the protective layer 15 has thickened, the pin 14 and the cover element 5 are firmly fastened to the layer 15 of protective material. The opening 18 on the bottom having a small section therefore represents a particularly preferred embodiment of fastening means foreseen on the pin 14 and embedded in the layer of protective material 15 to fasten the cover element 5 to the layer of protective material 15 and therefore also to the base structure 2.

In a particularly preferred embodiment, the seismic sensor 1 also includes a push rod 20, for example having a length of about 8-10 cm, foreseen in the lower part of the base structure 2 to drive the seismic sensor 1 to a greater level of depth, preferably to the base of the excavated area and in a layer of ground not excavated. This provision allows the sensor 1 to be given a particularly stable position, holding it positioned vertically.

Figure 2:
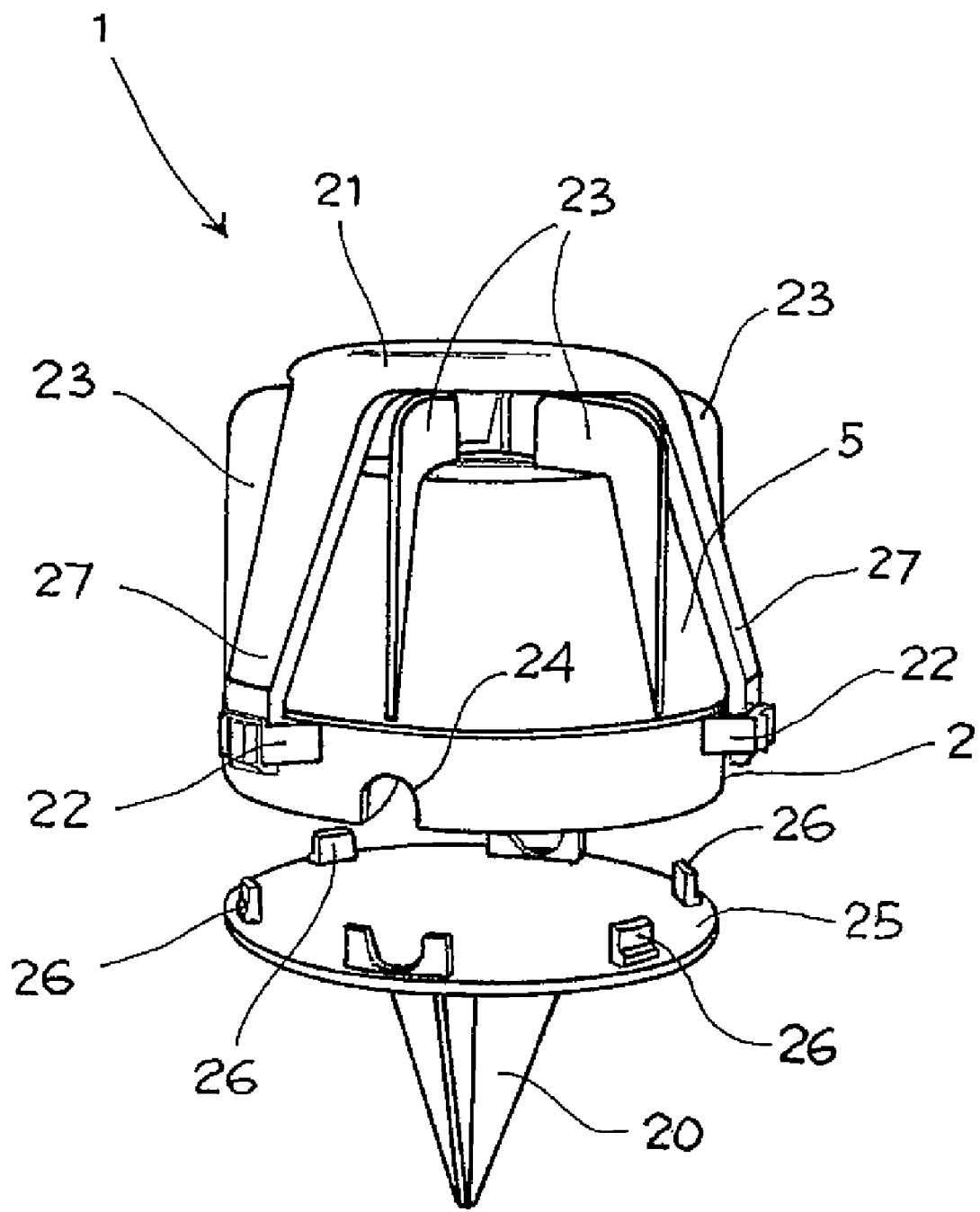
FIG. 2 shows a perspective view with some parts detached of a second embodiment of a sensor in accordance with the present invention.

FIG. 2 shows a variant embodiment of the seismic sensor in accordance with the present invention. The sensor 1 of FIG. 2 includes a protective lid 21 intended to attenuate excessively intense thrusts coming from above, in other words substantially perpendicular to the axis of the piezoelectric transducer 4. Advantageously, this allows the sensitivity of the seismic sensor 1 to the movements on the surface to be made substantially homogeneous. In the example of FIG. 2, the lid is equipped with feet 27 that allow the lid to be fixed to the base structure 2 of the sensor 1. In greater detail, the end portions of the feet 27 are such as to engage in suitable housing seats 22 foreseen on the outer walls of the base structure 2. In this way the thrusts collected by the lid 21 discharge onto the base structure 2 and not onto the receptor member 5.

The cover element 5, which in practice acts as a receptor member, is provided on the outside with a plurality of tabs 23 that are such as to increase the contact surface with the ground in order to obtain greater sensitivity.

In the example of FIG. 2 the seismic sensor 1 also includes a bottom cover 25 suitable for coupling with the base structure 2 on the opposite side with respect to the cover element 5. The push rod 20 is integrated in the bottom cover 25, and fastening elements 26 are foreseen for the coupling of the bottom cover 25 with the base structure 2.

Figure 3:
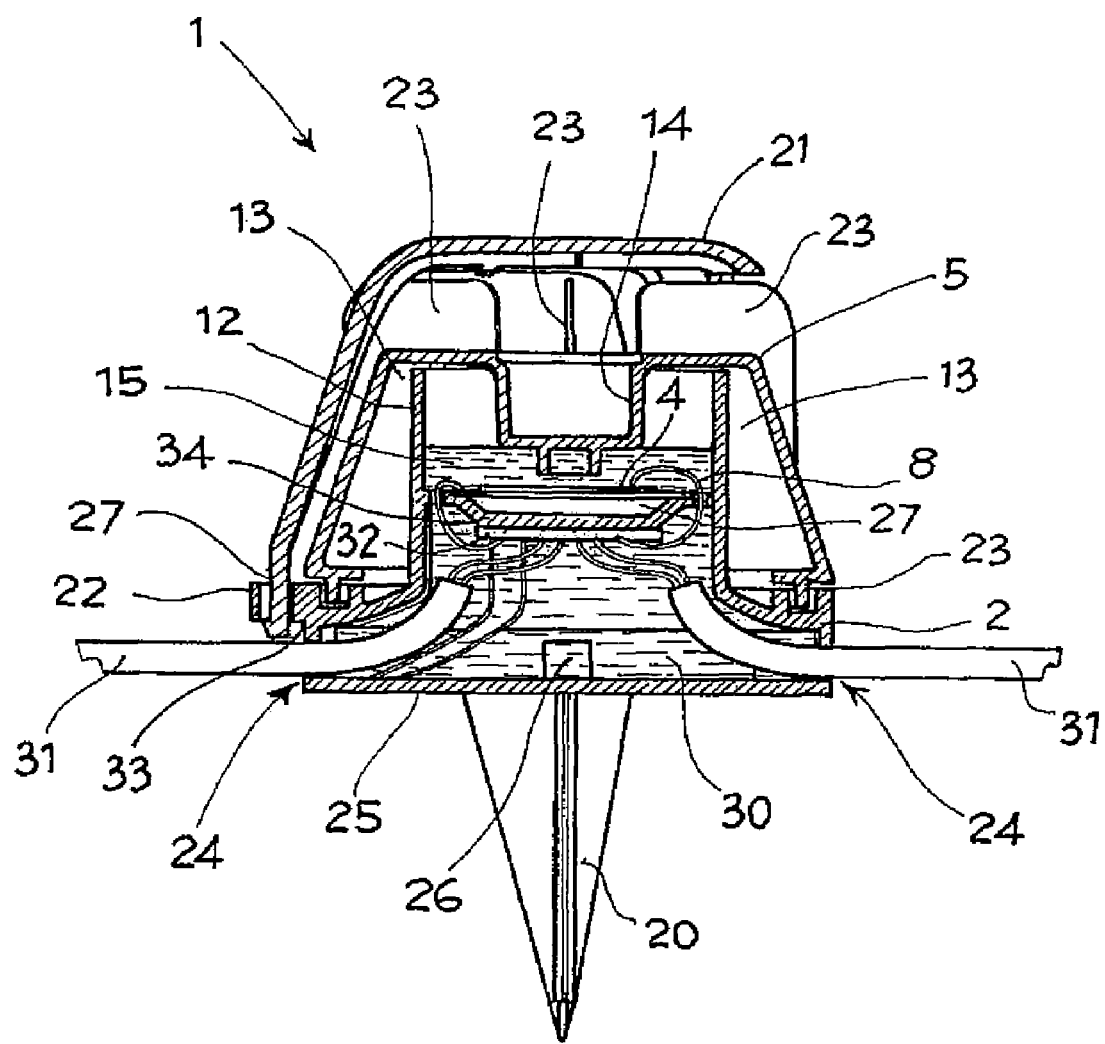
FIG. 3 shows a side view of the sensor of FIG. 2 with some parts in section.

FIG. 3 shows a side view with some parts in section of the seismic sensor 1 of FIG. 2. As can be observed from such a figure, the bottom cover 25 when coupled with the base structure 2 closes a lower space 30 preferably foreseen in the base structure 2 for housing the end portions of the connection cables 31 intended for the connection of the seismic sensor 1 to the remaining part of the security system. Suitable holes or recesses 24 made in the walls of the base structure 2, also visible in FIG. 2, are foreseen for the passage of the connection cables 31.

Preferably, the lower space 30 is located below the assembly seat of the transducer 4, for example foreseeing a partition 34 inside the collar 12. More preferably, the partition 34 is shaped so as to have a concave region that is able to act as a flexing chamber 7 for the transducer 4 when the transducer is rested on an edge of the partition 34 defining the concave region.

In a particularly preferred embodiment, once the cabling of the seismic sensor 1 has been carried out the lower space 30, which can possibly house electronic components like for example a printed circuit board 32, is also filled with protective material, like for example the same protective resin 15 used to seal the assembly seat of the transducer 4.

In a particularly advantageous embodiment, as shown in FIG. 3, the base structure 2 includes a groove 33 that surrounds the assembly seat 3 of the transducer 4 suitable for receiving a countershaped edge of the cover element 5, defining the bottom opening 10 thereof. Preferably, a thin layer of sealing material (not shown in the figures) is arranged between the groove 33 and the countershaped edge of the cover element 5. Preferably, such a sealing material has a sufficient softness to ensure the possibility of movement of the bell-shaped cover element 5 with respect to the base structure 2.

Preferably, limit stop means are provided to limit the size of the movement of the cover element 5 with respect to the base structure 2. In the example of FIG. 3 such limit stop means are represented by the same groove 33 and by the countershaped edge of the cover element 5 defining the bottom opening 10. Alternatively, or in addition, it is possible to size the height of the collar 12 so that its mouth goes into abutment against the inner surface of the cover element 5 to stop the forward movement of the cover element 5 with respect to the base structure 2.

As can be deduced from what has been outlined above, the purposes of the invention are fully accomplished, since a sensor in accordance with the present invention is able to resist infiltrations of water from the outside, even when the ground incorporating the sensor is completely flooded.

Of course, a man skilled in the art can make numerous modifications and variations to a sensor in accordance with the present invention, in order to satisfy contingent and specific requirements, all of which are in any case covered by the scope of protection of the invention, as defined by the following claims.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A seismic sensor for a security system, the sensor comprising:
    a piezoelectric transducer suitable for converting mechanical stresses into electrical signals;
    a base structure including a seat suitable for receiving said transducer; and
    a cover element that can be coupled with the base structure to define an inner chamber of said sensor, the cover element having a generally bell-shaped body, being equipped with a bottom opening and including side walls that extend around an axis of said bottom opening, the base structure being provided with a collar that surrounds said seat and that crosses said bottom opening so as to define at least one channel communicating with said chamber between the side walls of said cover element and said collar.

2. The seismic sensor according to claim 1, wherein said bell-shaped body is essentially in the form of an inverted pot.

3. The seismic sensor according to claim 1, wherein said bell-shaped body is essentially in the form of a bell-mouthed dome.

4. The seismic sensor according to claim 1, wherein said cover element is a receptor member of pressure waves and includes means for transferring mechanical stresses to said transducer in response to said pressure waves.

5. The seismic sensor according to claim 4, wherein said transfer means include a pin that projects from said cover element towards said transducer crossing the inner part of said collar.

6. The seismic sensor according to claim 1, further comprising inside said collar a layer of protective material defined between a contact surface with said transducer and an opposite free surface.

7. The seismic sensor according to claim 6, wherein said pin has an end portion embedded in said layer of protective material.

8. The seismic sensor according to claim 1, wherein said base structure has a groove that surrounds said collar and that configured to receive a countershaped free edge of said cover element that defines such an opening.

9. The seismic sensor according to claim 1, wherein said base structure includes a bottom chamber arranged below said assembly seat, to house end portions of connection cables for the connection of the sensor to a security system.

10. The seismic sensor according to claim 1, wherein said collar has a mouth arranged at a greater height than said opening, so that such a difference in height and the amount of air in said inner chamber and in said channel are to prevent infiltration of water inside the volume defined by said collar.

11. The seismic sensor according to claim 1, further comprising limit stop means to limit the size of the movement of said cover element with respect to said base structure.

12. The seismic sensor according to claim 1, further comprising a protective lid intended to attenuate excessively intense thrusts coming from above.

13. A security system including at least one seismic sensor, the seismic sensor comprising:
 a piezoelectric transducer suitable for converting mechanical stresses into electrical signals;
 a base structure including a seat suitable for receiving said transducer; and
 a cover element that can be coupled with the base structure to define an inner chamber of said sensor, the cover element having an essentially bell-shaped body, being equipped with a bottom opening and including side walls that extend around an axis of said opening, the base structure being provided with a collar that surrounds said seat and that crosses said bottom opening so as to define at least one channel communicating with said chamber between the side walls of said cover element and said collar.

14. The security system according to claim 13, wherein said bell-shaped body is essentially in the form of an inverted pot.

15. The security system according to claim 13, wherein said bell-shaped body is essentially in the form of a bell-mouthed dome.

16. The security system according to claim 13, wherein said cover element is a receptor member of pressure waves and includes means for transferring mechanical stresses to said transducer in response to said pressure waves.

17. The security system according to claim 16, wherein said transfer means include a pin that projects from said cover element towards said transducer crossing the inner part of said collar.

18. The security system according to claim 13, further comprising inside said collar a layer of protective material defined between a contact surface with said transducer and an opposite free surface.

19. The security system according to claim 18, wherein said pin has an end portion embedded in said layer of protective material.

20. The security system according to claim 13, wherein said base structure has a groove that surrounds said collar and that configured to receive a countershaped free edge of said cover element that defines such an opening.

21. The security system according to claim 13, wherein said base structure includes a bottom chamber arranged below said assembly seat, to house end portions of connection cables for the connection of the sensor to a security system.

22. The security system according to claim 13, wherein said collar has a mouth arranged at a greater height than said opening, so that such a difference in height and the amount of air in said inner chamber and in said channel are to prevent infiltration of water inside the volume defined by said collar.

23. The security system according to claim 13, further comprising limit stop means to limit the size of the movement of said cover element with respect to said base structure.

24. The security system according to claim 13, further comprising a protective lid intended to attenuate excessively intense thrusts coming from above.

25. A seismic sensor comprising:
 a base;
 a piezoelectric transducer coupled to the base;
 a collar coupled to the base and forming an inner chamber above the base, a mouth of the collar being situated above the base; and
 a cover element having;
  an upper portion spaced above the mouth of the collar; and
  a lower portion that extends below the mouth of the collar and surrounds the collar forming an outer chamber between the lower portion and the collar, the outer chamber being connected to the inner chamber via a space between the upper portion and the mouth.

26. The seismic sensor according to claim 25 comprising transmission means configured to transfer mechanical stresses from the cover element to the transducer.

27. The seismic sensor according to claim 26 wherein the transmission means comprises a central pin extending from the cover element through the mouth of the collar.

28. The seismic sensor according to claim 27 comprising a protective layer, the protective layer having:
 a bottom surface coupled to an upper surface of the transducer; and
 a top surface coupled to the central pin.

29. The seismic sensor according to claim 28 wherein the protective layer comprises a resin.

* * * * *